(12) United States Patent
Jörn

(10) Patent No.: US 8,104,712 B2
(45) Date of Patent: Jan. 31, 2012

(54) AIRCRAFT FUSELAGE ELEMENT

(75) Inventor: Paul J. Jörn, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 446 days.

(21) Appl. No.: 12/334,667

(22) Filed: Dec. 15, 2008

(65) Prior Publication Data

US 2009/0159747 A1     Jun. 25, 2009

Related U.S. Application Data

(60) Provisional application No. 61/014,842, filed on Dec. 19, 2007.

(30) Foreign Application Priority Data

Dec. 19, 2007   (DE) .......................... 10 2007 061 253

(51) Int. Cl.
*B64D 11/00*  (2006.01)
*B64D 13/00*  (2006.01)
*B64C 1/00*   (2006.01)
(52) U.S. Cl. ...................... 244/118.5; 244/119; 454/76
(58) Field of Classification Search ............... 297/118.5, 297/119, 129.1; 454/76; 244/118.5, 119, 244/129.1
See application file for complete search history.

(56) References Cited

U.S. PATENT DOCUMENTS

| | | | | |
|---|---|---|---|---|
| 5,472,760 A * | 12/1995 | Norvell | ..................... | 244/119 X |
| 5,577,688 A * | 11/1996 | Sloan | ........................ | 244/119 X |
| 5,759,659 A * | 6/1998 | Sanocki et al. | ........... | 244/119 X |
| 5,779,193 A * | 7/1998 | Sloan | ..................... | 244/118.5 X |
| 5,788,184 A * | 8/1998 | Eddy | ........................ | 244/119 X |
| 5,871,178 A * | 2/1999 | Barnett et al. | ............. | 244/118.5 |
| 6,065,717 A * | 5/2000 | Boock | ....................... | 244/119 X |
| 6,886,783 B2 * | 5/2005 | Guard et al. | .................. | 244/119 |
| 7,005,175 B2 * | 2/2006 | Hachenberg et al. | ..... | 244/119 X |
| 7,743,884 B2 * | 6/2010 | Thomas et al. | ........... | 244/119 X |
| 7,883,056 B2 * | 2/2011 | Mueller et al. | ................ | 244/119 |
| 2005/0211843 A1 * | 9/2005 | Simpson et al. | .............. | 244/119 |
| 2009/0044800 A1 * | 2/2009 | Jorn | ............................. | 454/76 X |

FOREIGN PATENT DOCUMENTS

DE           10154063         11/2003

* cited by examiner

*Primary Examiner* — Rodney B White
(74) *Attorney, Agent, or Firm* — Wood, Herron & Evans, LLP

(57) ABSTRACT

An aircraft fuselage element includes an outer shell and an inner shell that is disposed with clearance relative to the outer shell. An intermediate space between the outer shell and the inner shell is connectable to an air source. A ventilation aperture that is formed in the aircraft fuselage element and connectable to the air source is provided with a semi-permeable membrane. The semi-permeable membrane is permeable to air flow in both directions and permeable to water in a flow direction into the intermediate space from outside the outer shell or the inner shell.

13 Claims, 1 Drawing Sheet

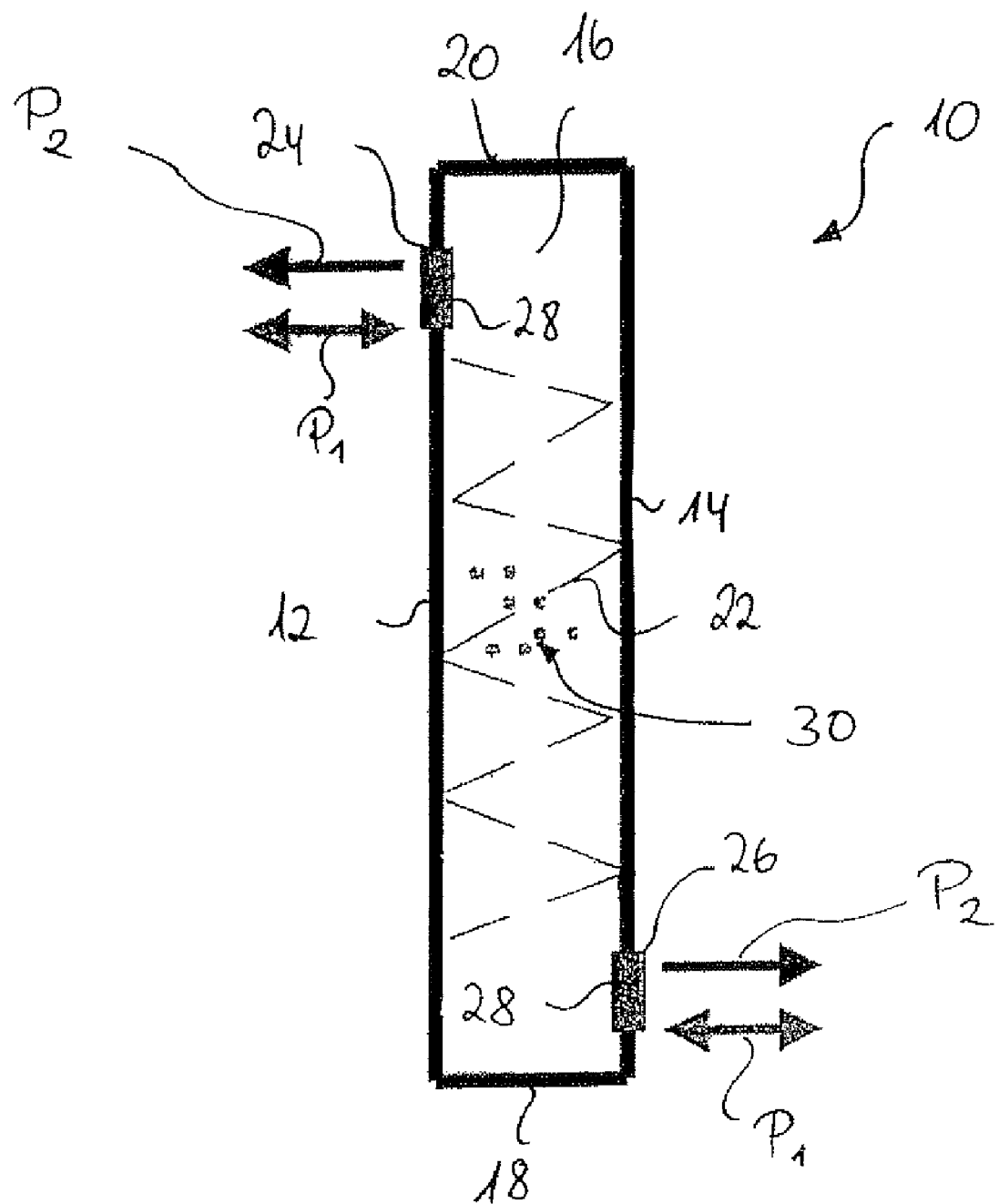

AIRCRAFT FUSELAGE ELEMENT

This application claims priority to U.S. Provisional Patent Application No. 61/014,842, filed on Dec. 19, 2007; and/or German Patent Application No. 102007061253.4, filed on Dec. 19, 2007.

TECHNICAL FIELD

The present invention relates to an aircraft fuselage element, comprising an outer shell and an inner shell that is disposed with clearance relative to the outer shell, wherein an intermediate space between the outer shell and the inner shell is connectable to an air source.

BACKGROUND

Passenger aircraft currently in use conventionally comprise an aircraft fuselage comprising a load-bearing aircraft structure, to the outside of which an aircraft skin is fastened. In the region of the passenger cabin appropriate trim elements, such as for example side panels, roof panels, door panels etc., are mounted with clearance relative to the aircraft skin on an inner side of the aircraft structure. The cabin trim elements may be made for example from a glass-fibre reinforced plastic sandwich material, An intermediate space provided between the aircraft skin and the cabin trim elements is used to accommodate insulating elements, which are used to insulate the passenger cabin, particularly while the aircraft is in flight, from the low ambient temperatures and from noise emissions caused for example by the aircraft engines. The insulating elements are conventionally made of glass wool enclosed in a plastic foil.

The known insulating elements make it possible to realize the required beat-insulating and sound-insulating properties. However, an aircraft fuselage structure comprising an aircraft skin, cabin trim elements disposed with clearance relative to the aircraft skin, and an insulating layer disposed between these components does have the drawback that the insulating layer takes up a relatively large amount of room and also increases the weight of the aircraft. Fitting the insulating elements is moreover a very costly operation. Finally, an accumulation of condensation water in the insulating elements that occurs while the aircraft is in flight and is avoidable usually only with difficulty results in an undesirable weight increase and can occasionally lead to corrosion damage. For this reason, if moisture accumulations in the insulating elements are detected, this entails costly drying or exchange of the insulating elements.

To eliminate these drawbacks, new concepts for the design of an aircraft fuselage are currently being developed For example, DE 101 54 063 A1 describes a primary structural element, which may be used in aircraft construction and comprises an inner and an outer top layer of aluminium or a fibre composite material as well as a core element in the form of a folded honeycomb structure that is disposed between the two top layers. According to DE 101 54 063 A1 an air stream flowing through the core element can be utilized to remove moisture from the core element and feed it to a moisture management device.

If however the air stream flowing through the core element is itself not very dry, the air stream flowing through the core element may also introduce moisture into the primary structural element. However, the accumulation of moisture between the top layers in the region of the core element, in a similar manner to moisture accumulation in the insulating layer of a conventional aircraft fuselage arrangement, leads to an undesirable increase of the weight of the primary structural element and may result in damage caused by corrosion or ice formation. To prevent the introduction of moisture into the intermediate space between the two top layers of the primary structural element, an air stream used to ventilate the core element may be dried before being fed into the core element. Drying of the air stream used to ventilate the core element however entails an extra outlay for equipment and increases both the energy demand and the weight of the system.

The object underlying the present invention is to provide a twin-shell aircraft fuselage elements with which in a simple and convenient manner it is possible to prevent harmful accumulations of water in the interior of the aircraft fuselage element.

SUMMARY OF THE INVENTION

To achieve this object, an aircraft fuselage element according to the invention comprises an outer shell and an inner shell that is disposed with clearance relative to the outer shell, wherein an intermediate space between the outer shell and the inner shell is connectable to an air source. In the assembled state in an aircraft, air that is supplied from the air source to the intermediate space can flow through the intermediate space provided between the outer shell and the inner shell of the aircraft fuselage element according to the invention. The air source is connectable to at least one ventilation aperture formed in the aircraft fuselage element. The aircraft fuselage element may however also have a plurality of ventilation apertures, which may then each be connectable to the air source in order to supply air to the intermediate space between the outer shell and the inner shell of the aircraft fuselage element.

Furthermore, in the aircraft fuselage element according to the invention at least one exhaust aperture may be formed, which is used to remove air from the intermediate space between the outer shell and the inner shell of the aircraft fuselage element. In dependence upon the pressure on the outer shell and/or the inner shell of the aircraft fuselage element, an aperture formed in the aircraft fuselage element may also act either as a ventilation aperture for supplying air into the intermediate space between the outer shell and the inner shell of the aircraft fuselage element or as an exhaust aperture for removing air from the intermediate space between the outer shell and the inner shell of the aircraft fuselage element.

The ventilation aperture which is formed in the aircraft fuselage element according to the invention and which is connectable to the air source is provided with a semi-permeable membrane. Here, by a semi-permeable membrane is meant a membrane that covers the ventilation aperture and prevents a first substance from penetrating into the intermediate space between the outer shell and the inner shell of the aircraft fuselage element, whilst allowing a second substance to penetrate into the intermediate space between the outer shell and the inner shell of the aircraft fuselage element. Preferably, each ventilation aperture formed in the aircraft fuselage element is provided with a semi-permeable membrane. Furthermore, an exhaust aperture or each exhaust aperture formed in the aircraft fuselage element may also be provided with a semi-permeable membrane. The semi-permeable membrane advantageously prevents the penetration of an unwanted substance into the intermediate space between the outer shell and the inner shell of the aircraft fuselage element according to the invention. At the same time, the semi-permeable membrane allows the unimpeded supply of a desired substance, for example air, into the intermediate space provided between the outer shell and the inner shell of the aircraft fuselage element according to the invention.

The semi-permeable membrane is preferably permeable to air in two directions of flow. The semi-permeable membrane then allows an unimpeded supply of air into the intermediate space between the outer shell and the inner shell of the aircraft fuselage element according to the invention. At the same time, an unimpeded removal of air from the intermediate space between the outer shell and the inner shell of the aircraft fuselage element according to the invention is possible. An aperture formed in the aircraft fuselage element may then act as a ventilation aperture or as an exhaust aperture in dependence upon the pressure conditions in the environment of the aircraft fuselage element according to the invention.

The semi-permeable membrane is preferably impermeable to water in at least one direction of flow. For example, the semi-permeable membrane may be impermeable to water in a direction of flow into the intermediate space between the outer shell and the inner shell of the aircraft fuselage element according to the invention. In this way the penetration of moisture into the intermediate space between the outer shell and the inner shell of the aircraft fuselage element according to the invention may be reliably prevented. Drawbacks associated with the development of moisture accumulations in the interior of the aircraft fuselage element according to the invention, such as for example an undesirable increase of the weight of the aircraft fuselage element or damage caused by corrosion or ice formation, may therefore be avoided, but at least considerably alleviated, even if an air stream is supplied without preliminary drying into the intermediate space between the outer shell and the inner shell of the aircraft fuselage element according to the invention.

In the aircraft fuselage element according to the invention, the penetration of moisture into the interior of the aircraft fuselage element through the ventilation aperture is prevented by means of the semi-permeable membrane. It has however emerged that multi-shelled structural elements often cannot be fully sealed against moisture. Especially in the case of glued structures, it is often impossible to rule out at least minimal leakages. Small leaks that occur for example in the region of glued joints may occasionally allow moisture to penetrate into the interior of the aircraft fuselage element according to the invention. In order to be able to remove this moisture from the intermediate space between the outer shell and the inner shell of the aircraft fuselage element according to the invention, an aperture formed in the aircraft fuselage element and acting as an exhaust aperture is preferably provided with a semi-permeable membrane that is permeable to water in a direction of flow out of the intermediate space between the outer shell and the inner shell of the aircraft fuselage element according to the invention.

As already mentioned, apertures formed in the aircraft fuselage element according to the invention may act as ventilation apertures or as exhaust apertures in dependence upon the pressure conditions in the environment of the aircraft fuselage element. In principle, it is possible to provide all of the apertures formed in the aircraft fuselage element with semi-permeable membranes of an identical type. These membranes are then preferably permeable to air in two directions of flow, impermeable to water in a direction of flow into the intermediate space between the outer shell and the inner shell of the aircraft fuselage element, and permeable to water in a direction of flow out of the intermediate space between the outer shell and the inner shell of the aircraft fuselage element. The semi-permeable membranes then allow an unimpeded flow of air through the apertures acting as ventilation apertures or as exhaust apertures. At the same time, the penetration of water through the apertures is prevented, whilst an unimpeded removal of moisture through the apertures is guaranteed. As an alternative to this, it is however also possible for different apertures formed in the aircraft fuselage element to be provided with semi-permeable membranes that have different properties.

As a material for the semi-permeable membrane or the semi-permeable membranes it is possible to use a polymer material, such as for example polytrimethylsilyl propine (PT-MSP), polyether imide (PEI), polytetrafluoroethylene (PTFE), polyether sulphone (PES) or polyethylene terephthalate (PET). Furthermore, in the aircraft fuselage element according to the invention a breathable membrane known for example from textile technology or a Nafion® membrane may be used as a semi-permeable membrane. Breathable membranes, such as for example Goretex® membranes are impermeable to water in liquid form yet allow water vapour to pass through. If the ventilation aperture of the aircraft fuselage element according to the invention is provided with such a membrane, the penetration of water in liquid form into the intermediate space between the outer shell and the inner shell of the aircraft fuselage element is prevented, whilst an unimpeded removal of moisture in the form. of water vapour from the intermediate space between the outer shell and the inner shell of the aircraft fuselage element is possible.

The ventilation- or exhaust aperture(s) formed in the aircraft fuselage element may be disposed in the outer shell and/or the inner shell of the aircraft fuselage element according to the invention. As an alternative or in addition thereto, it is further possible to dispose one ventilation or exhaust aperture or a plurality of ventilation- or exhaust apertures in an end connection element that is connected to the outer shell as well as the inner shell of the aircraft fuselage element.

The ventilation aperture of the aircraft fuselage element according to the invention may be connectable to the ambient atmosphere or an aircraft cabin, i.e. the interior of an aircraft cabin. A ventilation aperture connectable to the ambient atmosphere is disposed preferably in the outer shell of the aircraft fuselage element according to the invention. A ventilation aperture connectable to an aircraft cabin, on the other hand, is disposed preferably in the inner shell of the aircraft fuselage element. Furthermore, the ventilation aperture formed in the aircraft fuselage element may also be connectable directly or indirectly to an aircraft air-conditioning system, i.e. to an outlet line of an aircraft air-conditioning system, so that air may be supplied to the ventilation aperture from the aircraft air-conditioning system. If a plurality of ventilation apertures are provided in the aircraft fuselage element according to the invention, one ventilation aperture may be connectable to the ambient atmosphere and a further ventilation aperture may be connectable to an aircraft cabin or an aircraft air-conditioning system.

If a twin-shell aircraft fuselage element according to the invention dispenses with an insulating layer formed by conventional insulating elements, it is nevertheless possible to achieve a specific insulating effect with this element. For example, given an ambient temperature of −50° C., with an aircraft fuselage element according to the invention without an additional insulating layer inner wall temperatures, i.e. temperatures at an inner side of the inner shell, of above 0° C. may be realized. An inner wall target temperature of 20° C. is however not achievable, at any rate however not always achievable. For this reason, where necessary the aircraft fuselage element according to the invention may be provided with an insulating layer. The insulating layer may be fitted for example onto an inner side of the inner shell, i.e. a side of the inner shell that in the assembled state of the aircraft fuselage element faces an aircraft fuselage interior. Such an insulating layer may be designed much thinner and lighter in weight than a conventional insulating layer. As an alternative or in addition thereto, a cabin trim element that is to be fastened to the aircraft fuselage element according to the invention may for example carry an insulating layer on its side facing the aircraft fuselage element.

In order to guarantee that, given the use of an aircraft fuselage element according to the invention, a desired inner wall temperature is achieved at the inner side of the inner shell of the aircraft fuselage element, the ventilation aperture formed in the aircraft fuselage element may also be connectable to a source of warm air. The aircraft air-conditioning system for example may serve as a source of warm air. As an alternative or in addition thereto, it is however also conceivable for bleed air from the engines or warm air arising at some other point in the aircraft to be supplied through a separate line to the ventilation aperture formed in the aircraft fuselage element according to the invention.

In an air-swept twin-shell aircraft fuselage element the occurrence in the region of the fuselage element of pressure conditions that adversely affect the load-bearing capacity and hence the structural stability under load of the aircraft fuselage element should be prevented. For this reason, the ventilation or exhaust aperture(s) formed in the aircraft fuselage element according to the invention is/are preferably disposed and dimensioned in such a way that in the intermediate space between the outer shell and the inner shell of the aircraft fuselage element according to the invention a desired pressure may be adjusted.

Furthermore, the semi-permeable membrane(s) may also be devised so as to adjust a desired pressure in the intermediate space between the outer shell and the inner shell of the aircraft fuselage element according to the invention. For example, a differential pressure that builds up in an air flow upon flowing through a membrane over the membrane is dependent upon the thickness of the membrane and upon the material properties of the membrane (porosity, pore size distribution, etc.). In the intermediate space between the outer shell and the inner shell of the aircraft fuselage element according to the invention a pressure or pressure distribution is preferably adjusted, at or with which the structural load of the aircraft fuselage element is minimized. A suitable arrangement and dimensioning of the ventilation or exhaust apertures as well as the selection of a suitable semi-permeable membrane may therefore have a positive influence upon the load state of the aircraft fuselage element according to the invention while in operation.

For further control of the desired pressure in the intermediate space between the outer shell and the inner shell of the aircraft fuselage element according to the invention, the aircraft fuselage element according to the invention moreover preferably comprises a closure element, which in an open position opens the ventilation aperture and in a closed position closes the ventilation aperture. If a plurality of ventilation apertures are formed in the aircraft fuselage element according to the invention, preferably each ventilation aperture is provided with a corresponding closure element. What is more, there is preferably also associated with each exhaust aperture formed in the aircraft fuselage element according to the invention a closure element for opening and closing the exhaust aperture.

In the intermediate space between the outer shell and the inner shell of the aircraft fuselage element according to the invention a core element designed in the form of a folded honeycomb structure may be disposed. To enable two-dimensional ventilation of the folded honeycomb structure, the folded honeycomb structure may also be perforated. As an alternative thereto, the core element may also comprise a spacer fabric or a slotted honeycomb structure. All that matters is that the core element may be swept by an air stream that is supplied to the interior of the aircraft fuselage element through the ventilation aperture.

The inner shell and/or the outer shell of the aircraft fuselage element according to the invention may be made of metal, such as for example aluminium, or a fibre composite material, such as for example glass-fibre reinforced plastics material or carbon-fibre reinforced plastics material. Furthermore, the inner shell and/or the outer shell of the aircraft fuselage element according to the invention may alternatively be made of a combination of a metal and a fibre composite material.

The present invention further relates to an aircraft fuselage system, which comprises an aircraft fuselage element as described above as well as an air source that is connected to the intermediate space between the outer shell and the inner shell of the aircraft fuselage element.

The air source may be the ambient atmosphere, an aircraft cabin, i.e. an interior of an aircraft cabin, an aircraft air-conditioning system or some other separate air source to be provided onboard an aircraft. The air flow supplied by the air source may, if required, be controlled in a desired manner for example by means of an electronic or mechanical control unit. For example, the electronic or mechanical control unit may be adapted so as to control the air flow, which is supplied by the air source, in a desired manner with regard to the flow volume, the flow rate and/or the pressure, so that the air flow may be supplied with a desired volume flow, at a desired rate and/or a desired pressure to the ventilation aperture of the aircraft fuselage element.

Preferably, the air source is a source of warm air. The warm air flow supplied to the ventilation aperture of the aircraft fuselage element is then used for active insulation of the intermediate space between the outer shell and the inner shell of the aircraft fuselage element so that, even given very low ambient temperatures at an outer side of the outer shell, at an inner side of the inner shell a desired inner wall temperature of for example 20° C. may be achieved.

BRIEF DESCRIPTION OF THE DRAWINGS

The accompanying FIGURE shows the preferred embodiment of the invention.

There now follows a detailed description of a preferred embodiment of an aircraft fuselage element according to the invention with reference to the accompanying diagrammatic FIGURE, which shows a cross section of an aircraft fuselage element according to the invention.

DETAILED DESCRIPTION OF THE PREFERRED EMBODIMENT

An aircraft fuselage element 10 represented in the FIGURE is intended for use as a primary structural element and comprises an outer shell 12 that forms a skin of an aircraft fuselage. An inner shell 14 is disposed with clearance relative to the outer shell 12, thereby forming an intermediate space 16 between the outer shell 12 and the inner shell 14. In the assembled state of the aircraft fuselage element 10, the inner shell 14 faces a cabin disposed in the interior of the aircraft fuselage.

The aircraft fuselage element 10 is provided at its ends with connection elements 18, 20, which connect the outer shell 12 to the inner shell 14. The connection elements 18, 20 also form an interface with adjacent fuselage elements or other aircraft structures. The outer shell 12, the inner shell 14 and the connection elements 18, 20 are made of metal, a fibre composite material or a combination of a metal and a fibre composite material.

Disposed in the intermediate space 16 between the outer shell 12 and the inner shell 14 is a core element 22, which is designed in the form of a perforated folded honeycomb structure. As an alternative thereto, the core element 22 might comprise a spacer fabric or be designed in the form of a slotted honeycomb structure.

Formed in the outer shell 12 is a first aperture 24, which in the assembled state of the aircraft fuselage element 10 connects the intermediate space 16 between the outer shell 12 and the inner shell 14 to the ambient atmosphere. Formed in the inner shell 14 is a second aperture 26, which in the assembled state of the aircraft fuselage element 10 connects the intermediate space 16 between the outer shell 12 and the inner shell 14 to the aircraft cabin. As an alternative thereto, the second aperture 26 in the assembled state of the aircraft fuselage element 10 may also be connected to an air outlet line of an aircraft air-conditioning system. The first and the second aperture 24, 26 are each provided with a semi-permeable membrane 28, i.e. the semi-permeable membrane 28 extends over the flow cross section of the first and the second aperture 24, 26.

As is indicated in the FIGURE by the arrows $P_1$, the semi-permeable membrane 28 is permeable to air in two directions of flow. In dependence upon the pressure conditions in the environment of the aircraft fuselage element 10 and/or the pressures acting upon the apertures 24, 26 air may therefore be supplied through both the first aperture 24 and the second aperture 26 into the intermediate space 16 between the outer shell 12 and the inner shell 14. In an identical manner, in dependence upon the pressure conditions in the environment of the aircraft fuselage element 10 and/or the pressures acting upon the apertures 24, 26 air may be removed from the intermediate space 16 between the outer shell 12 and the inner shell 14 both through the first aperture 24 and through the second aperture 26. The intermediate space 16 between the outer shell 12 and the inner shell 14 may therefore be ventilated either by an air flow that is supplied through the first aperture 24 and removed through the second aperture 26 or by an air flow that is supplied through the second aperture 26 and removed through the first aperture 24. In the intermediate space 16 the perforations of the core element 22 ensure an unimpeded flow through the core element 22.

As is indicated in the FIGURE by the arrows $P_2$, the semi-permeable membrane 28 is permeable to water in one direction of flow only, namely in a direction of flow out of the intermediate space 16 between the outer shell 12 and the inner shell 14. In a direction of flow into the intermediate space 16 between the outer shell 12 and the inner shell 14, on the other hand, the semipermeable membrane 28 is impermeable to water. The semi-permeable membrane therefore effectively prevents the penetration of moisture into the interior of the aircraft fuselage element 10 through the apertures 24, 26. At the same time, moisture accumulations 30 that have formed in the intermediate space 16 between the outer shell 12 and the inner shell 14 for example as a result of minor leaks in the aircraft fuselage element 10 may be removed unimpeded from the interior of the aircraft fuselage element 10.

The apertures 24, 26 axe so disposed and dimensioned and the semi-permeable membrane 28 is so selected in terms of its thickness and its material properties that in the interior of the aircraft fuselage element 10 a pressure is adjustable, which leads to the lowest possible structural load of the aircraft fuselage element 10.

In order even at low ambient temperatures to be able to achieve an inner wall temperature of for example 20° C. at an inner side of the inner shell 14 facing the aircraft cabin, warm air may be supplied through the second aperture 26 to the intermediate space 16 between the outer shell 12 and the inner shell 14. As an alternative or in addition thereto, the aircraft fuselage element 10 may also be provided with an insulating layer, which is not shown in the FIGURE. The insulating layer may be fitted for example onto the inner side of the inner shell 14 facing the aircraft cabin.

The invention claimed is:

1. An aircraft fuselage element, comprising:
    an outer shell,
    an inner shell coupled to the outer shell with clearance relative to the outer shell, wherein an intermediate space between the outer shell and the inner shell is connectable to an air source, and
    a ventilation aperture formed in the aircraft fuselage element and connectable to the air source, the ventilation aperture provided with a semi-permeable membrane that is permeable to air and impermeable to water in a direction of flow into the intermediate space from outside the outer shell or the inner shell.

2. The aircraft fuselage element according to claim 1, wherein the semi-permeable membrane is permeable to air in two directions of flow.

3. The aircraft fuselage element according to claim 1, wherein the ventilation aperture is disposed in the outer shell, the inner shell, and/or a connection element, which is connected to the outer shell as well as the inner shell.

4. The aircraft fuselage element according to claim 1, wherein the ventilation aperture is connectable to the ambient atmosphere, an aircraft cabin, or an aircraft air-conditioning system.

5. The aircraft fuselage element according to claim 1, wherein the ventilation aperture is connectable to a source of warm air.

6. The aircraft fuselage element according to claim 1, wherein the ventilation aperture and/or the semi-permeable membrane are/is adapted so as to adjust a desired pressure in the intermediate space between the outer shell and the inner shell.

7. The aircraft fuselage element according to claim 1, further comprising:
    a closure element, which in an open position opens the ventilation aperture and in a closed position closes the ventilation aperture.

8. The aircraft fuselage element according to claim 1, further comprising:
    a core element designed in the form of a folded honeycomb structure disposed in the intermediate space between the outer shell and the inner shell.

9. The aircraft fuselage element according to claim 1, wherein the outer shell and/or the inner shell are made of metal, a fibre composite material, or a combination of a metal and a fibre composite material.

10. An aircraft fuselage system, comprising:
    an aircraft fuselage element according to claim 1, and
    an air source that is connected to the intermediate space between the outer shell and the inner shell of the aircraft fuselage element.

11. The aircraft fuselage system according to claim 10, wherein the air source is the ambient atmosphere, an aircraft cabin, or an aircraft air-conditioning system.

12. The aircraft fuselage system according to claim 10, wherein the air source is a source of warm air.

13. An aircraft fuselage element, comprising:
   an outer shell,
   an inner shell that is disposed with clearance relative to the outer shell, wherein an intermediate space between the outer shell and the inner shell is connectable to an air source, and
   a ventilation aperture formed in the aircraft fuselage element and connectable to the air source, the ventilation aperture provided with a semi-permeable membrane,
   wherein the ventilation aperture and/or the semi-permeable membrane are/is adapted so as to adjust a desired pressure in the intermediate space between the outer shell and the inner shell.

* * * * *